United States Patent [19]

Baker et al.

[11] 4,127,485

[45] Nov. 28, 1978

[54] VACUUM FILTER FOR SWIMMING POOLS

[76] Inventors: William H. Baker, 30 Honeysuckle Woods, Clover, S.C. 29710; Frederick Wall, 707 Belleview Rd., Rock Hill, S.C. 29730

[21] Appl. No.: 812,978

[22] Filed: Jul. 5, 1977

[51] Int. Cl.$^2$ ............................................. E04H 3/20
[52] U.S. Cl. .................................... 210/169; 210/275
[58] Field of Search ............... 210/169, 275, 277, 278, 210/279

[56] References Cited

U.S. PATENT DOCUMENTS

| | | | |
|---|---|---|---|
| 1,758,331 | 5/1930 | Perkins | 210/169 |
| 2,472,309 | 6/1949 | Opsahl | 210/169 |
| 2,506,125 | 4/1970 | Willis et al. | 210/474 |
| 3,184,111 | 5/1965 | Watson et al. | 210/169 X |
| 3,247,968 | 4/1966 | Miller | 210/169 X |
| 3,537,111 | 11/1970 | Whitten, Jr. | 210/169 X |
| 3,587,861 | 6/1971 | Ross | 210/277 |
| 3,788,982 | 1/1974 | Zsoldos, Jr. et al. | 210/169 |
| 3,817,378 | 6/1974 | Ross | 210/275 |
| 3,969,248 | 7/1976 | Whitmer | 210/169 |
| 4,032,443 | 6/1977 | Ross | 210/275 |

*Primary Examiner*—Theodore A. Granger

[57] ABSTRACT

A vacuum filter for vacuum flow filtration through a filter bed of water from a swimming pool is provided, comprising an open-top tank; a filter bed of particulate material in the tank; fluid flow connections communicating the tank with a water recirculation system for the swimming pool, one adjacent an upper portion and one adjacent a lower portion of the filter bed; an inlet line communicating the swimming pool with the tank and maintaining the level of water in the tank at a level corresponding to a level of water in the swimming pool, thereby providing a head of water for gravity backwash flow through the filter bed, and valves controlling flow into the tank via the fluid flow connections between the tank and the inlet line, and between the tank and the water recirculation system; and a direct fluid flow connection communicating a gutter drain of the swimming pool with the tank; a vacuum is drawn downstream of the filter bed by a pump recirculating filtered water to the swimming pool.

In a preferred embodiment, the tank has a dividing wall extending across the tank and separating the tank into first and second compartments; a filter bed of particulate material in the second compartment; two fluid flow connections communicating the two compartments, one adjacent an upper portion and one adjacent a lower portion of the filter bed; two fluid flow connections communicating the second compartment with a water recirculation system for the swimming pool, one adjacent an upper portion and one adjacent a lower portion of the filter bed; an inlet line communicating the swimming pool with the first compartment and maintaining the level of water in the first compartment at a level corresponding to the level of water in the swimming pool, thereby providing a head of water for gravity backwash flow through the filter bed.

16 Claims, 7 Drawing Figures

VACUUM FILTER FOR SWIMMING POOLS

Most swimming pools built today include a perimeter gutter and a water recirculation system taking water from the gutter or directly from the pool, cleaning it, and then recycling the clean water to the pool. The water recirculation system when the pool is quiescent may draw a skimming flow off the top of the pool through one or a plurality of skimming weirs or skimming gutter, and also a bottom flow directly from the pool via the main drain. Both flows are combined, pumped through a filter bed, and then returned to the pool, if desired after the addition of bactericides such as halogen. When the pool is active, in addition to any skimming flow considerable amounts of water from the pool may also splash over into the gutter, and this water also is returned via the water recirculation system to the pool, after having passed through the filter.

The pump for recirculating the water through the filter bed and back to the pool is normally placed between the pool drain and/or gutter drain and the filter bed, so that dirty water is forced under pressure through the filter. This of course requires a filter tank built to withstand relatively high internal fluid pressures, and as the filter bed becomes burdened with contaminants, the upstream fluid pressure can increase. The necessity of housing the filter bed in a pressure tank of course increases the cost of the filter system.

In this type of system, when the filter bed is to be cleaned, this is normally accomplished by a reverse flow or backwash flow of water through the bed, unloading the contaminants, which are now on the downstream side of the bed, and carrying them off with the backwash flow. For the purpose, backwash pumps, elevated storage tanks, or other devices have been required, to supply the backwash water, and cause it to flow through the bed in the reverse direction.

Filter systems in which the water is drawn through the bed by a slight vacuum drawn on the downstream side of the bed, by placing the water recirculation pump downstream of the filter rather than upstream, have been known for a long time, but in recent years have not been widely used. Mitchell U.S. Pat. No. 883,467 dated Mar. 31, 1908 shows such a system. Similar systems are shown in U.S. Pat. No. 3,061,100 to Fehlmann dated Oct. 30, 1962 and U.S. Pat. No. 3,616,468 to Takacs dated Nov. 2, 1971. In both Mitchell and Takacs the water travels through the bed by gravity, and is drawn out through the pump, whence it is pumped back to the pool. Fehlmann shows a similar system, and in addition the pump is reversible, and can reverse the flow of water through the bed, so as to unload the contaminants by backwashing.

While the principles of construction of a filter tank for use with swimming pools have been appreciated for a considerable time, it has not been easy to design a filter that does not pose problems in use. Swimming pool water can be highly corrosive, and unless the surfaces of the equipment contacting it are corrosion-resistant, or coated so as to prevent corrosion, the life of the component can be rather short. This is particularly true of filter tanks, which are normally made of metal. While stainless steel can be used, it is rather expensive, and to minimize costs the choice is normally a coated metal material, but coatings can wear, or flake, or chip so that the metal surface must be susceptible of being inspected from time to time, to make sure that it is properly protected. It is also necessary of course to change the filter bed from time to time, and to service component parts such as values, and this requires ease of access.

It is desirable that the filter be relatively simple to operate, with a minimum of wearable parts and parts that can go out of order, so as to avoid the need for taking the filter out of service for inspection and repair. Nowadays, it is also necessary that the filtered water be of the very highest standard, since the sanitary and health codes laid down by the governmental authorities are becoming more and more stringent, and ever more difficult to meet.

In accordance with the invention, a vacuum filter for vacuum flow filtration through a filter bed of water from a swimming pool is provided, comprising an open-top tank; a filter bed of particulate material in the tank; fluid flow connections communicating the tank with a water recirculation system for the swimming pool, one adjacent an upper portion and one adjacent a lower portion of the filter bed; an inlet line communicating the swimming pool with the tank and maintaining the level of water in the tank at a level corresponding to a level of water in the swimming pool, thereby providing a head of water for gravity backwash flow through the filter bed, and valves controlling flow into the tank via the fluid flow connections, between the tank and the inlet line, and between the tank and the water recirculation system; and a direct fluid flow connection communicating a gutter drain of the swimming pool with the tank; a vacuum is drawn downstream of the filter bed by a pump recirculating filtered water to the swimming pool.

In a preferred embodiment of the invention, a vacuum filter for swimming pools is provided comprising an open-top tank; a dividing wall across the tank, separating the tank into first and second compartments; a filter bed of particulate material in the second compartment; first and second fluid connections communicating the two compartments, the first adjacent an upper portion and the second adjacent a lower portion of the filter bed; third and fourth fluid flow connections communicating the second compartment with a water recirculation system for the swimming pool, the third adjacent an upper portion and the fourth adjacent a lower portion of the filter bed; an inlet line communicating the swimming pool with the first compartment and maintaining the level of water in the first compartment at a level corresponding to a level of water in the swimming pool, thereby providing a head of water for gravity flow through the filter bed in either direction, via either the first or second fluid flow connections; and valves controlling flow between the compartments via the fluid flow connections; between the first compartment and the inlet line; and between the second compartment and the water recirculation system. A direct line connection also is provided communicating a gutter drain of the swimming pool with the second compartment, with a valve controlling flow between the gutter drain and the second compartment.

A vacuum is drawn downstream of the filter bed via either outlet fluid flow connection by a pump recirculating filtered water to the swimming pool.

A feature of the invention is the separate entry into the filter chamber or compartment both of main drain flow from the swimming pool and gutter flow from the perimeter gutter system of the swimming pool. A water level in the filter compartment is maintained by virtue of the pressure head in the swimming pool, for the purpose of gravity backwash flow, and this head of pressure also makes possible regulation of the proportionate volume of flow entering the filter chamber from the main drain and from the gutter. In effect, increasing gutter flow throttles back main drain flow from the swimming pool, in proportion to the increase in gutter flow.

This is because flow from the gutter into the filter compartment increases the water level in the filter compartment above the normal water level maintained under the pressure head from the swimming pool via the main drain. An increase in level in the filter compartment has a throttling effect on the flow through the main drain into the compartment, slowing down main drain flow, since such flow now encounters the increased pressure head in the filter compartment. As gutter flow increases, so does the pressure head in the compartment, and the throttling of the main drain flow also increases in proportion.

This throttling effect ensures that there will be a sufficient capacity reserved in the water recirculation system downstream of the vacuum filter to accommodate increased gutter flow, and prevent flooding of the gutters. Thus, the vacuum filter of the invention provides an accommodation to increased gutter flow by throttling back main drain flow, in proportion to pressure head in the filter compartment.

This pressure head can be provided either by feeding main drain flow into an antechamber before the filter compartment, or by feeding main drain flow directly into the filter compartment, as shown in the embodiments of the invention illustrated in the drawings.

This vacuum filter is of an extremely simple design because it utilizes gravity flow for backwash flow of the water through the filter bed, and in fact is capable of backwash flow under the static head of pressure in the main drain from the pool or in the first compartment, which corresponds to the static head of pressure of the swimming pool, at least when the pool is filled to the normal level. Since the filtration is under atmospheric pressure, while a vacuum is drawn downstream of the filter bed by the water recirculation pump, it is not necessary to use a heavy closed pressure vessel for the filter tank. Since backwashing is by gravity flow, a uniform percolation of the water through the bed is ensured, making is possible to backwash the bed completely in all portions without the need for any external power source, such as backwash pumps, elevated storage tanks, or other devices. The water that is used is the water from the swimming pool, which can be replenished without difficulty in the normal way from the make-up supply.

Because the pressure downstream of the surface of the filter bed while the pump is withdrawing the flow downstream of the bed is below atmospheric, the water flows evenly through the bed in either direction, under laminar flow conditions, so that there is no possibility of short-circuiting through the bed, with contaminant breakthrough. High differential pressure across the bed cannot build up, even when the bed is heavily loaded with contaminants. Contamination of the effluent water due to breakthrough the bed eliminated, because of the low differential pressure. True flow streamlines are formed within the bed, giving a true contact/adsorption system, ensuring complete removal of suspended particles from the incoming water. Since no parts of the system are under any pressure greater than atmospheric, the system is simple, safe and reliable. Moreover, exposure of the water after filtration to a pressure below atmospheric allows gases normally dissolved in the water to escape from solution. These collect below the filter bed, but the discharge of the collected gases can easily be accomplished by stopping the flow through the bed from time to time, thus permitting the gases to percolate upwardly in reverse flow direction through the bed without encountering a counterflow of water, and to escape into the atmosphere from the surface of the water. Since the filter can be contained within an open tank, there is easy and complete access to any component part at all times.

Preferred embodiments of the vacuum filter in accordance with the invention are shown in the drawings, in which.

The vacuum filter of FIGS. 1 to 5 has an open tank 1 separated by dividing wall 3 into two compartments 2 and 4. The open tank provides easy access to all parts of the vacuum filter.

The filter tank 1 is designed to receive water to be filtered by gravity flow from a body of water such as a swimming pool 10. For ease of access, the tank is beside the pool 10, outside the perimeter gutter 22, with the top level with the ground surface. The top 1a of the tank is high enough to contain water from the pool within the tank, without overflowing, when the pool is filled.

Compartment 2 has an inlet line 5 and a valve 9 for closing off the inlet line 5. The line 5 is connected to the main drain 8 of the swimming pool 10. Water from the swimming pool when the valve 9 is open flows into the compartment 2 by gravity, and will fill the compartment 2 with water to a level N corresponding to the level of water in the swimming pool. The valve 9 will normally be open when the filter is on-stream, and the valve 9 is also open when the filter is being cleaned by backwashing, as will presently be seen. If however repairs to the tank are needed, or the filter bed is to be replaced, then the valve 9 can be closed.

Also opening into the compartment 2 is a line 11 in flow connection via valve 16 with a manifold 12 at the bottom of compartment 4. The manifold 12 is composed of a header line 13, extending across the compartment 4, with lateral feeder pipes 14 extending at right angles therefrom in a four-inch spacing across the bottom 6 of the compartment 4. Water can flow in either direction through the manifold 12 and header-lateral feeder pipe system 13, 14, during backwash, for distribution of unfiltered water from compartment 2 to the bottom 6 of the compartment 4, or, during filtration, for collection of filtered water from the bottom 6 of the compartment 4.

At its outlet end, the manifold and header system 13, 14 is in flow communication via line 13 with valve 15 and the water recirculation pump 17. In normal on-stream operation, the water at the bottom of the compartment 4 will be clean, having passed through the filter bed 37, and passes via valve 15, which is open while the filter is on-stream, through the recirculating pump 17 and then returned to the swimming pool via return line 19 and filter return valve 20 to the clean water feed conduit 21, at the pool perimeter beside the gutter 22.

Part way up the compartment 2 is an inlet line 30, flow through which from compartment 2 is controlled by the flap valve 24. The inlet line 30 opens into the upper portion of the compartmemt 4.

Extending across tank 1 through compartments 2, 4 in flow connection with inlet line 5 is a bypass line 23, which connects via valve 29 with manifold 31 leading to the water recirculation system and with outlet line 43 running to waste. Line 23 makes it possible to drain the pool when the water level in the pool is at the level of the main drain line.

The compartment 4 is provided with another inlet line 25 from which water can enter into the upper portion of the compartment 4 on a level slightly above the level N and the line 23 from compartment 2. The line 25 can be closed off by the valve 27, a flap valve similar to valve 24, controlling inlet flow through line 30. The line 25 in this illustrated embodiment is connected to the gutter system 22, and at its outlet end in compartment 4 is at a level low enough for water to flow by gravity from the gutter system 22 through the line 25 into the compartment 4, in a manner similar to the gravity flow from the swimming pool 10 via the main drain 8 and line 5 into compartment 2, and line 30 into compartment 4.

Extending horizontally all the way across the compartment 4 below line 23 across the top of the particulate filter bed 37 is an apertured plate 35, with a plurality of apertures 36, and serving as a flow distribution plate. The bed in this case is of sand, having a particle size of not less than 0.45 mm and not exceeding 0.55 mm, but other particulate filter materials can be used, in single or multilayers, including, for example, charcoal and gravel of the same or various particle sizes. It is frequently desirable to arrange the bed in layers, with the layer of the largest or coarsest particles on the bottom, and the layer of the finest particles towards the top, to provide a continually increasing pore size in the bed in the direction of fluid flow, for more efficient filtration, and also to facilitate cleaning of the bed by backwashing. It will be seen that the particulate filter bed 37 completely surrounds and embeds the header and manifold system 13, 14 at the bottom of the compartment 4.

The operation of the recirculation pump withdraws water from the bottom of compartment 4 via the manifold system 12, and header line 13. Consequently, suction is applied to the downstream face of the filter bed 37. Since the fluid pressure on the upstream side of the bed is the total of atmospheric pressure plus the static head of water pressure in the pool, the effect of the pump suction in drawing a vacuum on the downstream side of the bed aids in inducing water to percolate uniformly through all parts of the bed.

Extending above the top of the sand bed all the way across compartment 4, so that the horizontal flow of backwash does not exceed a distance of 2.5 feet, is a backwash trough 45 which is in flow communication with line 40. Line 40 is connected via valve 41 with the manifold system 31 leading to the recirculation pump 17, and via valve 44 and line 43 to waste. Line 40 is placed approximately 6 inches above the sand bed, thus ensuring minimum head gradients under backwashing conditions.

The apertured plate 35 has the function of breaking up any turbulent flow at the top of the compartment 4, due to the inrush of water through the inlet line 30 from the compartment 2, and the line 25 from the gutter system 22. The apertures 36 are small enough to filter any large debris that might pass into the filter compartment 4 via line 25 from the gutter system 22.

In operation, with the vacuum filter on the filtering mode, the main drain inlet valve 9 is open, as also is the valve 24 leading into line 30, and valve 27 on line 25, while the valve 16 on line 11 is closed. On the downstream side of the filter, the valves 29, 41 and 44 are closed, and the valve 15 open, permitting the water in the header and manifold system 12, 13, 14 to pass to the recirculating pump 17, for recirculation via line 19 back to the swimming pool. The pump is operated, causing a vacuum in the header and manifold system 12, 13, 14. Dirty water from the main drain 8 of the swimming pool enters the compartment 2 via line 5, and then enters the compartment 4 via line 30, or from the gutter system 22 via line 25, directly into the compartment 4. All such water passes downwardly through the sand filter bed 37, enters the header manifold system 12, 13, 14, and then passes through line 13 and valve 15 to the pump 17, and back to the pool via the filtered water return line 19.

Under such conditions, water in the compartment 4 is at level N. If activity in the pool increases, due to a number of bathers entering the water, gutter water flow via line 25 may increase. When the gutter flow increases, the water level in the compartment 4 rises, above the minimum operating level indicated as N to a higher level, indicated as L1. As the water level rises, it reduces the effective head available to cause water to flow from the inlet chamber 2 via line 30 into the compartment 4, thus reducing the flow from the inlet compartment via line 30, and therefore from the main drain 8. This automatically reduces the flow into the compartment 4, to compensate for the increased flow from the gutter system, thus making it possible for the water recirculation system to accommodate the increased flow from the gutter system by reducing intake from the main drain.

In the event that pool activity increases further, water level in the filter chamber 4 also rises, and eventually may equal or exceed that in the inlet chamber 2. Then, there will no longer be any head inducing water to flow from the inlet compartment 2 into the filter compartment 4, and all such flow will cease. All water flow through the water recirculation system now enters the compartment 4 from the gutter system. This ensures that the gutter will not flood during the period of maximum pool activity.

When activity in the pool decreases again, the flow of water from the gutter also decreases. The level of water in the compartment 4 consequently decreases, and when it is below the level of water in the inlet compartment 2, water again begins to flow from the inlet compartment into the filter compartment 4.

Thus, at all degrees of activity in the pool, a balance is maintained between main drain flow via line 5 entering the inlet compartment 2 and from there into the filter compartment 4, and gutter flow via line 25 entering the filter compartment 4 from the gutter system. This balance is proportional to activity in the pool.

From time to time, the accumulation of dirt removed by the sand bed 37 in the space 42 between the plate 35 and the top of the sand bed 37 increases the differential pressure across the sand bed, and reduces effectiveness of the filter by reducing flow through the filter. In order to prevent starvation of the pump, and a diminution in water recirculation flow, it becomes necessary to clean the filter. The valves are accordingly adjusted to put the filter on the cleaning mode, by backwash.

This requires that the recirculation pump 17 be stopped, and the backwash drain valves 41 and 44 be opened, while the valves 24 and 29 are closed. The backwash inlet valve 16 is now opened, and the gutter drain valve 27 closed.

Accordingly, water entering the inlet compartment 2 from the main drain 8 now flows by gravity into the header and manifold system 12, and thence percolates upwardly through the sand bed 37 into the backwash-receiving trough 45, carrying with it dirt accumulated on the surface of the sand bed. This dirty water now enters the backwash drain line 40 from the trough, and proceeds past the valve 44 via a gravity drain 43 to waste. If a gravity drain to waste is not available, the pump may be used to remove dirty water during the backwash cleaning cycle.

If a gravity drain is used, the backwash system provides back flow through the filter bed under the same conditions as during filtering, except that the flow is in the reverse direction, thus ensuring laminar flow, and uniform, complete backwashing of all parts of the bed.

After the filter bed has been cleaned, the filter can be put back on-stream in the filter mode. The backwash transfer valve 16 is closed, the backwash drain valves 41 and 44 are closed, and the gutter valve 27 and the inlet valve 24 from the inlet compartment 2 are opened. Water then can enter the filter compartment 4 above the deflector plate 35. When the water has reached the minimum operating level in the filter compartment 4, the recirculating pump 17 is restarted, and the filter is again put on-stream in the filter mode.

The vacuum drawn on the filtered water in the header and manifold system 12 and downstream thereof will aid in removing dissolved gases in the dirty water. These gases will accumulate in the bottom portion 6 of the compartment 4, below the bed 37. To vent them, the following system can be used. From time to time, a time clock controlling the recirculating pump can automatically stop the pump for a brief period, so that the bubbles of gas collected in the bed can migrate upwardly, in compartment 4. They can do so because now they no longer have to fight a flow of water through the bed in the opposite direction. After passing through the bed, they can escape to atmosphere at the open top of the tank 1.

Figure 1:
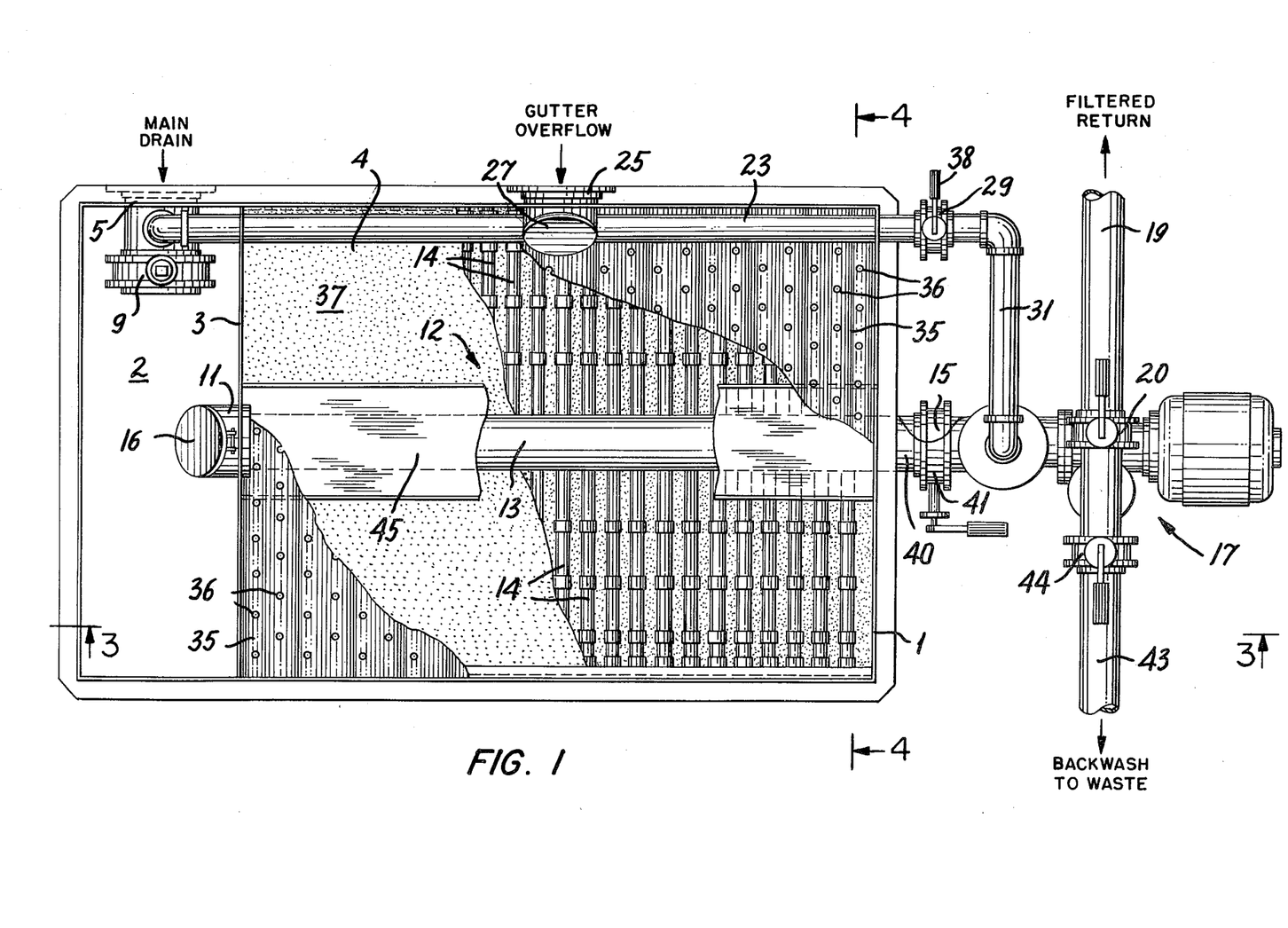
FIG. 1 represents a top or plan view of one embodiment of the vacuum filter.
Figure 2:
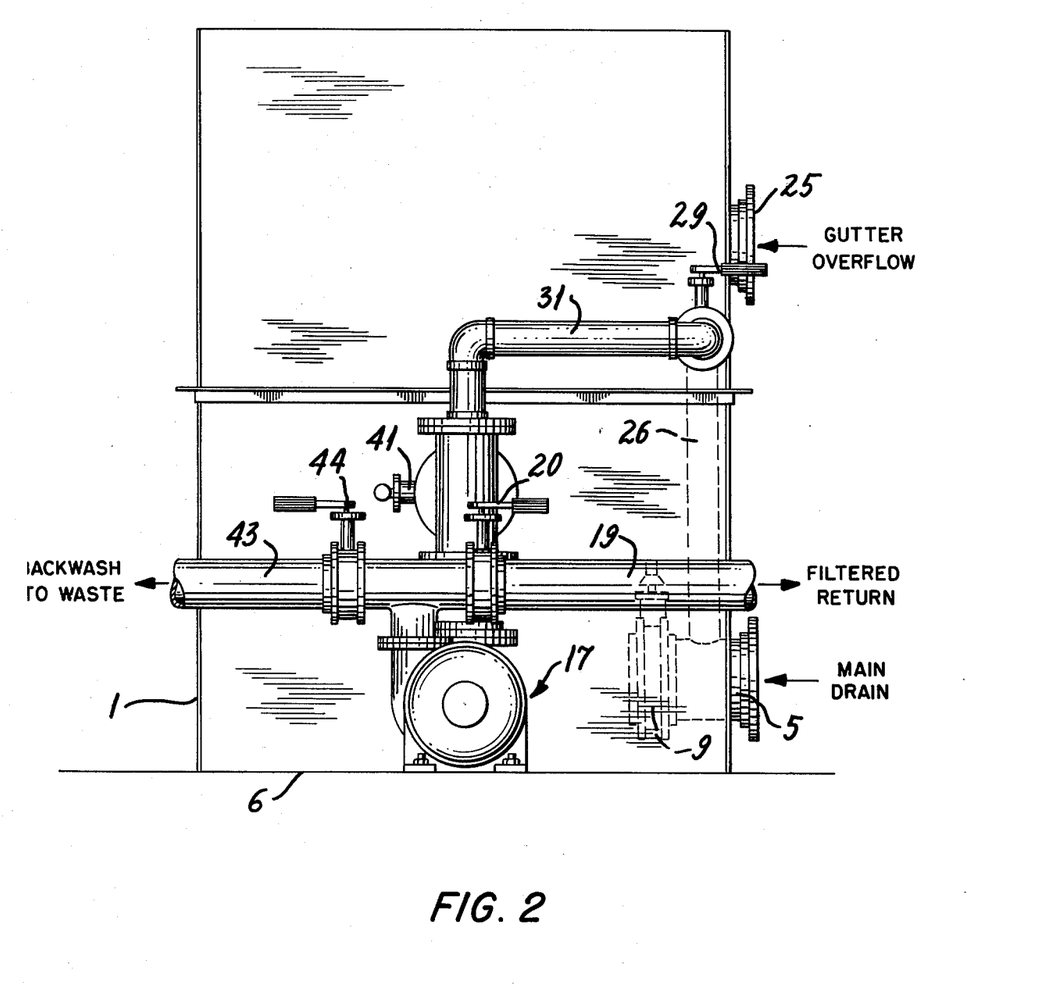
FIG. 2 represents an end view of the vacuum filter of FIG. 1.
Figure 3:
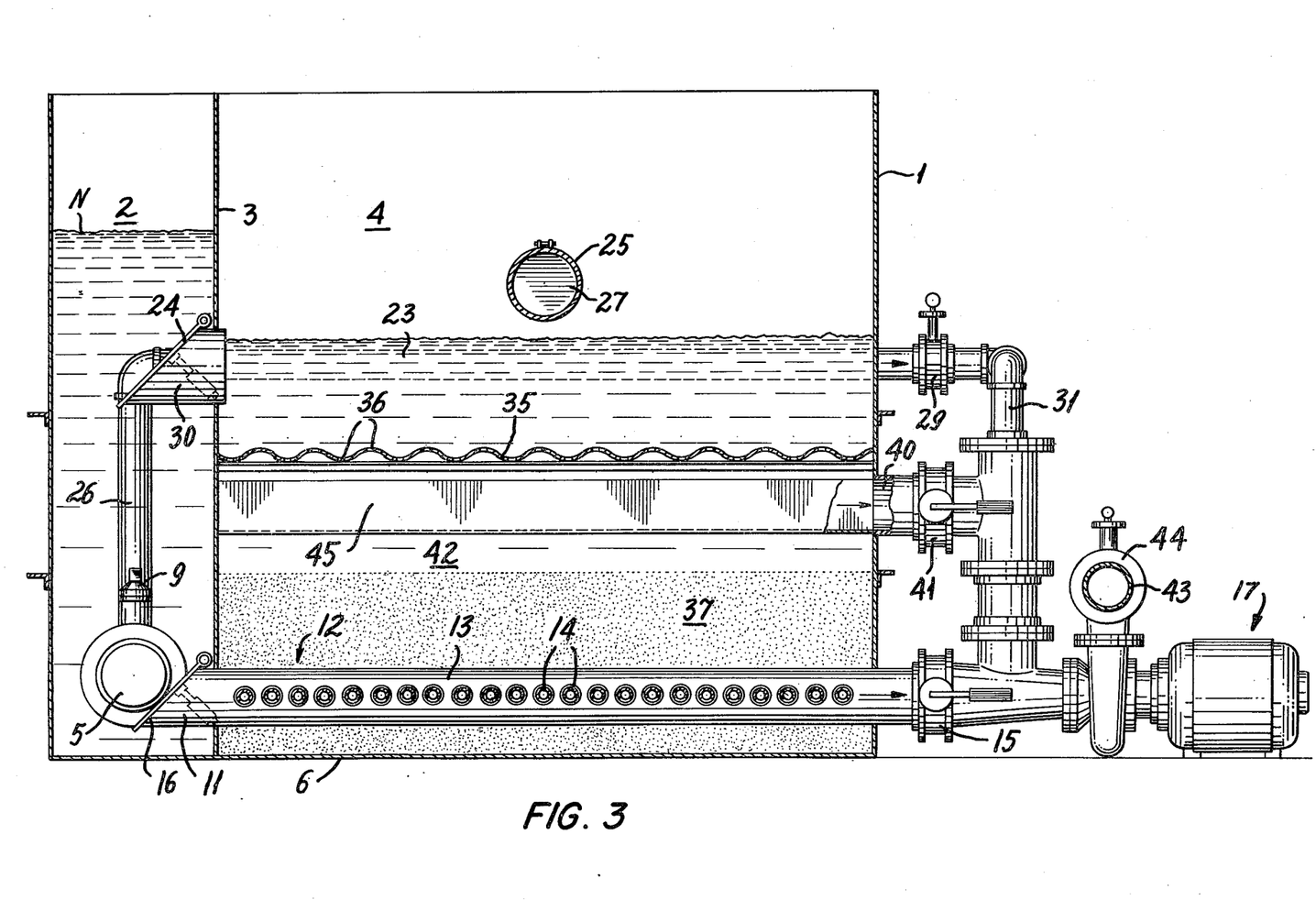
FIG. 3 represents a longitudinal sectional view taken along the line 3,3 of FIG. 1.
Figure 4:
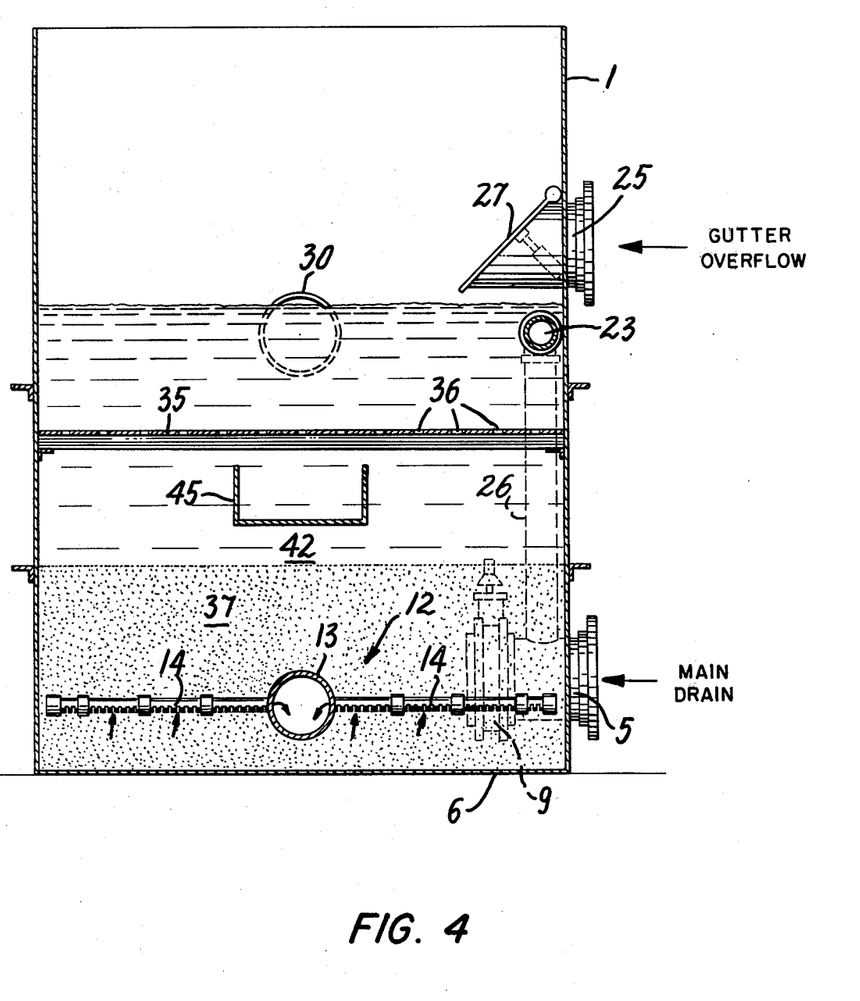
FIG. 4 represents a cross-sectional view taken along the line 4,4 of FIG. 1.
Figure 5:
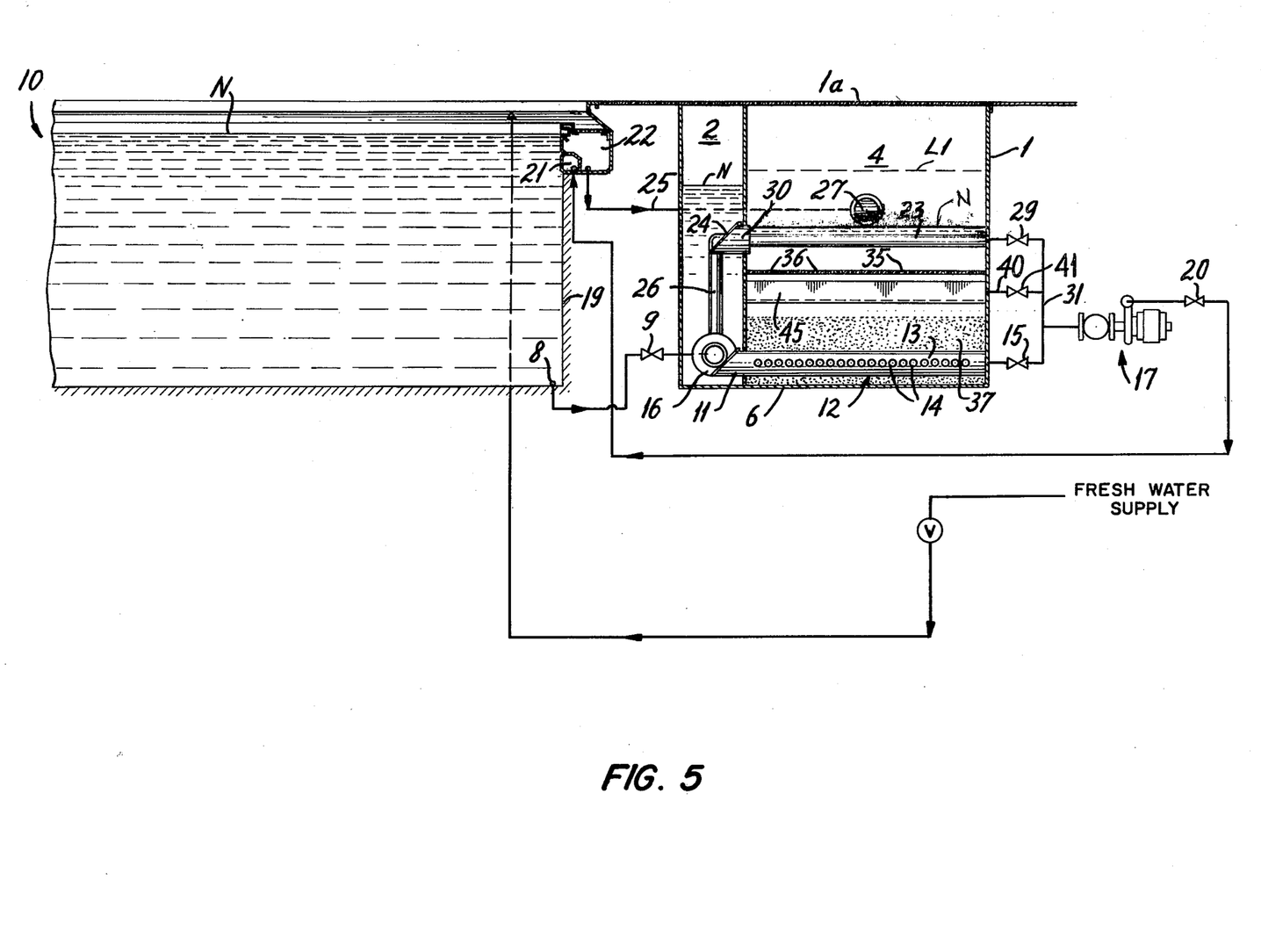
FIG. 5 is a schematic view showing the water recirculation system of a swimming pool, with the vacuum filter of FIGS. 1 to 4 installed.
Figure 6:
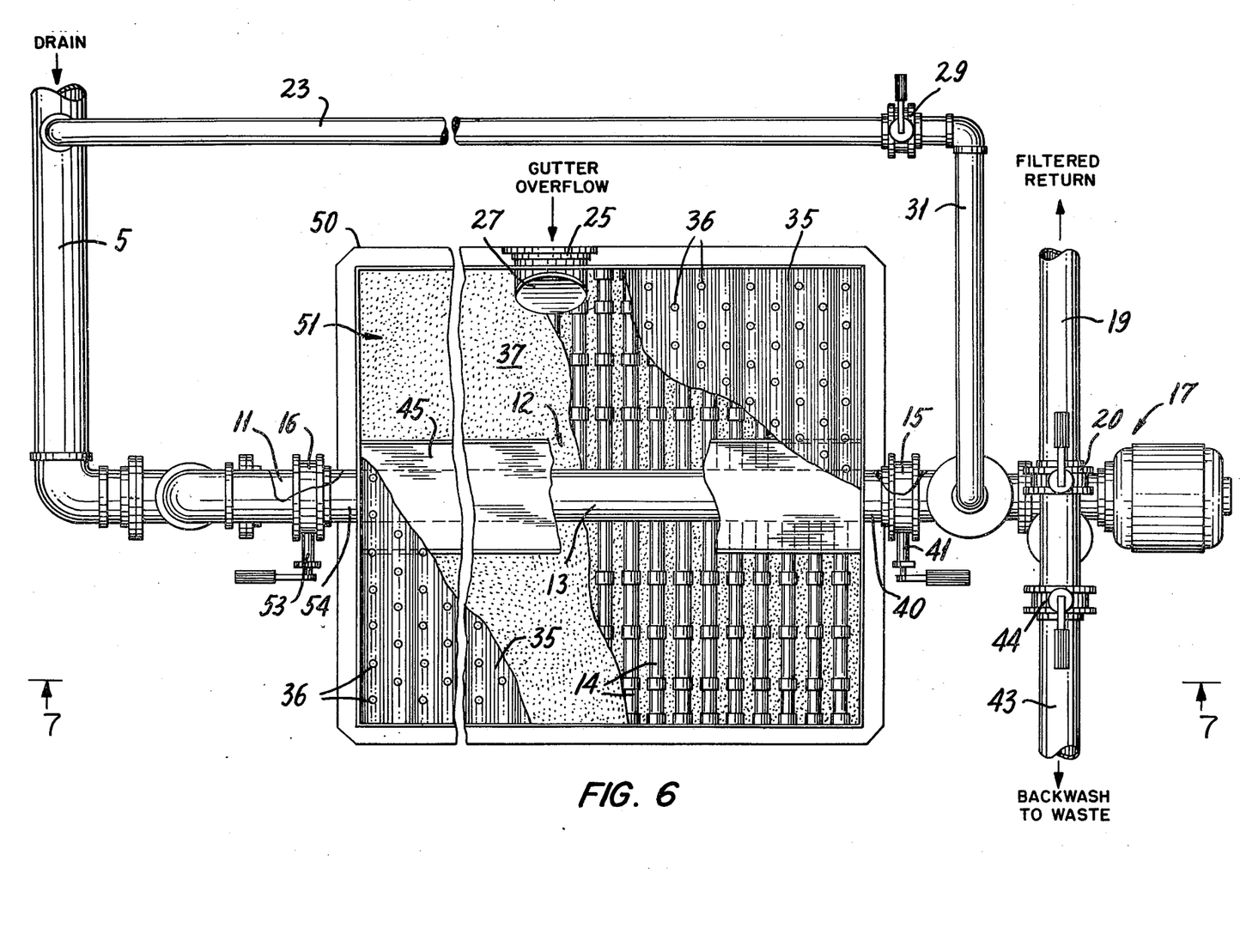
FIG. 6 is a side elevation, partly in section, of another embodiment of the vacuum filter.
Figure 7:
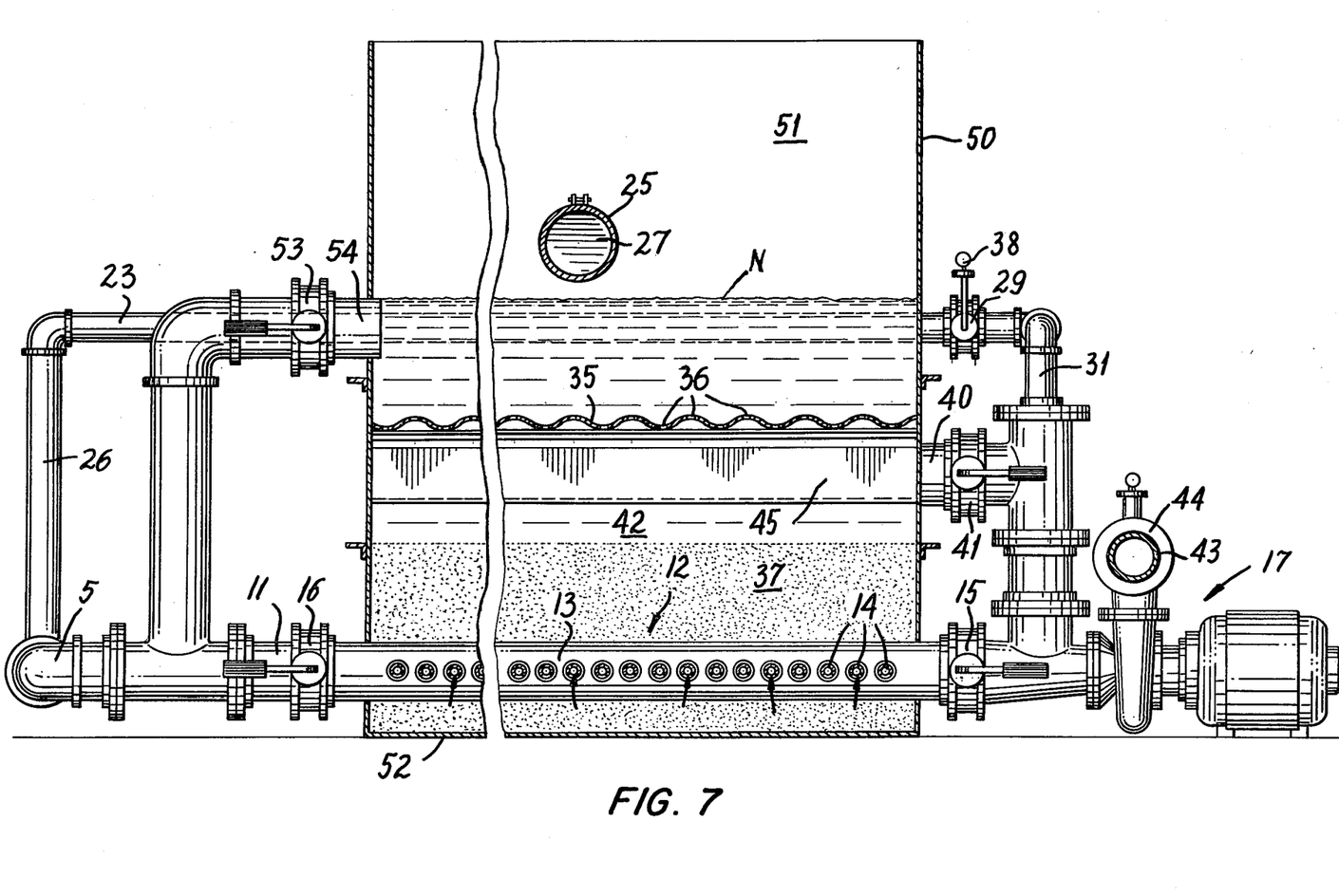
FIG. 7 is a top or plan view of the vacuum filter of FIG. 6.

The embodiment shown in FIGS. 6 and 7 is similar to that of FIGS. 1 to 5, with the exception that the vacuum filter has only one compartment, a filter compartment 51, instead of two. Consequently, like reference numerals are used for like parts.

The vacuum filter of FIGS. 6 and 7 has an open top tank 50 with a filter compartment 51 and with line connection 5 from the main drain 8 of the swimming pool 10, and line connection 25 from the perimeter gutter system 22. At the bottom 52 of the filter compartment 51 is a manifold 12 including a header 13 and feeder pipe 14 water distribution system, connected to the main drain 5 by the inlet connection 11, with the valve 16 interposed. The header system 12, 13 and 14 leads past valve 15 into the water outlet manifold collection system 31 and thence to the water circulation pump 17, with a side line 43 to waste, protected by valve 44. Also leading into the water outlet manifold system 31 is a line connection 40 in the upper portion of the filter chamber 51, at a level slightly below the level of the inlet line 54 connected to the main drain 5 via valve 53, and pool drain line 23 and valve 29, bypassing the filter tank 50 to connect outlet manifold 31 to inlet line 5.

Within the filter compartment 51 is a sand bed filter 37, of the same type as in the vacuum filter of FIGS. 1 to 5. Above the filter bed is a distributor plate 35, and a backwash trough 45, in flow connection with line 40.

The operation of this vacuum filter is very similar to that of the vacuum filter of FIGS. 1 to 5. Water flows into the filter chamber 51 from the main drain 5, and from the perimeter gutter line connection 25. Inlet flow from the main drain proceeds via the inlet line 54 past valve 53 into the filter compartment 51, above the water distribution plate 35, and a level of water N is maintained in the compartment above the plate, according to the pool level. The water is drawn through the plate 35 and the filter bed 37, and is collected in the feeder pipes 14 and the header pipe 13 of the manifold system 12, whence it is drawn out by the pump 17 past the valve 15 via the water outlet manifold 31, and enters the water recirculation system, where it is recirculated back to the swimming pool via the clean water feed line 19 to the water feed conduit 21.

When activity in the pool increases, so that flow through the perimeter gutter begins, or if there be a skimming flow that exceeds the normal skimming flow volume, the water level in the filter compartment 51 rises above the level N. As it does so, the static pressure head in the compartment increases, and this has the effect of slowing down flow entering the compartment via the inlet line 54 from the main drain 5, increasing the capacity of the water recirculation system for gutter flow. Increasing gutter flow increases the water level in the filter compartment, and correspondingly further reduces the flow from the main drain 5. When activity slows, and the gutter flow decreases, the main drain flow increases in proportion, as the pressure head and water level in the compartment 51 drops. Thus, the system is self-adjusting, in accordance with the proportion of flow entering the filter compartment via the main drain line 5 and the gutter line 25.

In this filtration mode of operation, the valve 16 is of course closed, and the valve 41 is closed as well, compelling the flow through the vacuum filter to proceed by downflow through the filter bed 37, after which it is withdrawn from the vacuum filter by the vacuum pump 17.

As the layer of contaminants filtered out by the filter bed 37 grows, the pressure drop across the filter bed increases, and eventually the pressure drop across the filter bed is such that the deposit of contaminants on the bed must be cleaned out, in order to maintain adequate filtered water recirculation flow to the pool. For operation on the backwash mode, the valve 16 is opened, the valve 15 closed, the valves 41 and 44 opened, and the valve 53 closed. The recirculation pump 17 is stopped, because backwash flow can proceed by gravity from the main drain line 5, upwardly through the filter bed 37, and to waste by way of the valve 44 and line 43.

Flow from the main drain 8 of the swimming pool 10 now proceeds past the open valve 16 through the inlet line 11 and the manifold system 12 via the header 13 and the feeder pipes 14 to the space below the bed 37. Water flows upwardly through the bed to the water collection trough 45, and thence proceeds through the outlet line 40 past the open valve 41 and the water outlet manifold system 31 to the open valve 44, and then through the line 43 to waste. Because the flow through the bed is by gravity, the water percolates uniformly throughout the bed, and there is uniform cleaning action in all parts of the bed. The layer of contaminants on top of the bed 37 is lifted off and carried away by the backwash flow, to waste through the line 43.

When using a sand bed of the particle size indicated, this vacuum filter is capable of producing a filtered water effluent having a turbidity of less than 0.5 FTU (Formazen Turbidity Unit) at a flow rate of 20 gallons per square foot per minute. The particle size removal is down to less than 0.5 micron, well below the limit of human vision, which is 10 microns. Thus, the filtered effluent is of the very highest quality. Because of the very even water flow patterns through the bed, the filter is capable of producing rapid flow through the bed with high efficiency filtration at flow rates between 13 and 20 gallons per square foot per minute.

Because the filter is flat bottomed, can be square or rectangular in shape, and is a very simple design, the filter tank can be placed in virtually any available location at a level corresponding to the pool itself. Access around the filter is not required, and header room requirements are very low because there is an open top, and there are no filter elements or filter cartridges to be removed. Thus, as shown in FIGS. 1 to 5, 6 and 7, the filter can be placed in the ground beside the pool, with the top of the tank 1 at deck level or below deck, with access permitted through a top cover. The circulating pump can be placed immediately adjacent to the filter, or can be located some distance away. Since the filter is self-cleaning under conditions corresponding to the conditions when it is on-stream in the filter mode, automatic controls can be easily and economically applied. Moreover, because of the ease of access, even coated metals can be used for the tank construction, since the open tank allows easy access for examination of the integrity of a coating, and for recoating, as required.

Variations of the design shown in the Figures will be apparent to those skilled in the art. For example, the backwash trough 45 and drain line 40 need not be provided.

The valves controlling flow between the two compartments of the filter tank and between the inlet and outlet lines and the various compartment can be controlled manually or by an external power source, such as mechanically, electrically, pneumatically, or hydraulically.

In addition, several of the valves can be controlled from the level of water in their respective compartments by the addition of a float. For example, the valve controlling flow between the first compartment and the second compartment at the upper portion of these compartments can be float-controlled, in a manner to diminish or halt flow when the level of water in the second compartment is above a predetermined level. In this way, flow from the main drain of the pool, for example, can be diminished or stopped, when the flow from the gutter drain entering the second compartment independently by way of the line 25 is increased, such that the water level in the second compartment rises above normal. The valve can then be held at any predetermined intermediate positions between open and closed, gradually approaching the closed position, as the level of water in the second compartment rises, so that the flow from the first compartment can be diminished in proportion to the increase in flow from the gutter drain.

The particulate material composing the filter bed can be composed of sand and/or rock of the same or different grades, in admixture or in several layers. The layers can for example be laid down with increasing coarseness from bottom to top within the tank. For example, the layers can comprise a topmost layer of No. 20 sand. This layer will preferably be the thickest, and can be approximately one half of the filter bed. A second layer of No. 12 sand can be placed directly below the first layer. This will be of substantially less thickness than the preceding layer. The next layer can be a layer of rock of $\frac{1}{8}$ to $\frac{1}{4}$ inch in diameter. This layer will be approximately equal in thickness to the preceding layer. The bottommost and coarsest layer can be composed of one quarter to one half inch rock, and this will fill the remainder of the space in the tank.

It is also possible to employ a bed composed of a single layer of one grade of sand, as illustrated in the embodiment shown in the drawings. Materials such as charcoal, vermiculite, perlite, and other suitable filter materials can be included, alone or in admixture, and the particular thickness, position or coarseness of any given layer or of the entire bed will be selected with reference to the requirements of the system to which the filter is connected.

The influent and effluent lines and connections can be formed from available pipe and plumbing fixtures.

The tank influent and effluent line and other parts of the filter can be formed of steel, stainless steel, aluminum, copper, brass and the like, and is preferably of corrosion-resistant or corrosion-resistant-coated metals. Plastic materials also can be used, particularly polytetrafluoroethylene, polypropylene, polyethylene, polystyrene, and polycarbonate resins, either entirely or as coatings.

Above and below the bed there can be arranged screens or mesh filters or other apertured retainers which support the particulate material of the bed, and prevent migration of the prticles downstream under either normal or reverse flow. These screens can be held in the tank supports, so as to be kept away from the sides and bottom of the tank.

Flat filter meshes and screens can also be used, alone or in combination with other supports, interposed among and between the various layers of the filter bed, to provide added filtration and layer separation. A relatively coarse screen which is adapted to be readily removed or easily reached for cleaning can be provided above the topmost layer, to remove gross-size contaminants such as leaves, twigs, bugs and the like, which may enter the filter through the water recirculating system from either the pool or the gutter. Fibrous filter media are also suitable.

While the drawings show an open tank, the tank can also be formed with a removable lid, or in sectional portions which can readily be separated for cleaning. The juncture of the lid or sections of a tank can be formed by providing mating flanges on each of the two mating sections, or the lid or the tank body. Such flanges can be clamped together in a relatively fluid tight seal quite easily, and means for clamping the flanges together are well known. The preferred arrangement however is to form the tank as a single unit.

The manifold and header water distribution system shown in the drawings is a preferred embodiment, but other arrangements can also be employed, arranged to distribute the water relatively uniformly throughout the volume of the filter. While the drawings show a rectangular shape for the filter tank, the filter tank can also be cylindrical, in which event the distributor can take the form of a spoked wheel, having a plurality of apertures distributed over its surfaces. The distributors can be disposed on arms from a central hub, and communicate with the manifold as the hub. Other configurations and dispositions of the distributor are possible, including a star configuration, a hollow disc configuration, and the like. In all cases, the members extending from the manifold will have a plurality of apertures distributed over their surface, for the passage of water therethrough.

Having regard to the foregoing disclosure, the following is claimed as the inventive and patentable embodiments thereof:

1. A vacuum filter-swimming pool combination for vacuum flow filtration through a filter bed of water from a swimming pool, the swimming pool comprising a perimeter gutter and a water recirculation system having line connections from the pool and from the gutter to the vacuum filter and from the vacuum filter back to the pool, the vacuum filter comprising a tank open to atmospheric pressure; a dividing wall across the tank, separating the tank into first and second compartments; a filter bed of particulate material in the second compartment; first and second fluid flow connections communicating the two compartments, the first adjacent an upper portion and the second adjacent a lower portion of the filter bed; third and fourth fluid flow connections communicating the second compartment with the water recirculation system for the swimming pool, the third adjacent an upper portion and the fourth adjacent a lower portion of the filter bed; an inlet line communicating the swimming pool with the first compartment; a direct inlet line connection communicating the perimeter gutter of the swimming pool with the second compartment; and valves controlling flow between the compartments via the fluid flow connections, between the first compartment and the inlet line, and between the second compartment and the water recirculation system; the swimming pool being at a level equal to or above the level of the first and second compartments of the vacuum filter, for gravity flow of water therebetween, whereby the level of water in the swimming pool maintains a corresponding level of water in the first compartment, thereby providing a head of water for backwash flow upwardly through the filter bed; the water level in the filter compartment being maintained by the pressure head in the swimming pool at a first normal level, and flow from the gutter into the filter compartment increasing the water level in the filter compartment above the first normal water level with a resultant throttling effect on flow from the swimming pool into the compartment in proportion to increased gutter flow, and reserving a sufficient capacity in the water recirculation system to accommodate increased gutter flow, and prevent flooding of the gutter.

2. A vacuum filter according to claim 1, comprising a valve controlling flow between the gutter drain and the second compartment.

3. A vacuum filter according to claim 1, comprising a manifold and header line distribution system in the second compartment in fluid flow connection with the second and fourth fluid flow connections communicating the second compartment with the first compartment and with the water recirculation system, respectively.

4. A vacuum filter according to claim 1, comprising an apertured flow distributor in the second compartment extending across the compartment beneath the first flow connection and above the filter bed.

5. A vacuum filter according to claim 1, comprising a water collection trough in the second compartment, extending across the compartment above the filter bed, and in fluid flow communication at one end with an outlet line extending to outside the second compartment, for receiving and carrying off water from above the filter bed; and a valve controlling water flow through the outlet line.

6. A vacuum filter according to claim 1, comprising means for manually operating the valves between open and closed positions.

7. A vacuum filter according to claim 1, comprising means for automatically operating the valves between open and closed positions according to flow volume entering at least one of the first and second compartments.

8. A vacuum filter according to claim 1, comprising a pump in fluid flow connection with an outlet from the second compartment, drawing a vacuum on the downstream side of the filter bed, for recirculating filtered water to the swimming pool.

9. A vacuum filter according to claim 8, in which the pump is in fluid flow connection with the third and fourth fluid flow connections communicating the second compartment with the water recirculation system.

10. A vacuum filter-swimming pool combination for vacuum flow filtration through a filter bed of water from a swimming pool, the swimming pool comprising a perimeter gutter and a water recirculation system having line connections from the pool and from the gutter to the vacuum filter and from the vacuum filter back to the pool, the vacuum filter comprising a tank open to atmospheric pressure; a filter bed of particulate material in the tank; fluid flow connections communicating the tank with the water recirculation system for the swimming pool, one adjacent an upper portion and one adjacent a lower portion of the filter bed; an inlet line communicating the swimming pool with the tank; and valves controlling flow into the tank via the fluid flow connection between the tank and the inlet line, and between the tank and the water recirculation system; a direct fluid flow connection communicating the perimeter gutter of the swimming pool with the tank; and a pump for recirculating filtered water to the swimming pool, drawing a vacuum downstream of the filter bed; the swimming pool being at a level equal to or above the level of the tank of the vacuum filter, for gravity flow of water therebetween, whereby the level of water in the swimming pool maintains a corresponding level of water in the tank, thereby providing a head of water for backwash flow upwardly through the filter bed; the water level in the tank being maintained by the pressure head in the swimming pool at a first normal level, and flow from the gutter into the tank increasing the water level in the tank above the first normal water level with a resultant throttling of flow from the swimming pool into the tank, in proportion to increased gutter flow, and reserving a sufficient capacity in the water recirculation system to accommodate increased gutter flow, and prevent flooding of the gutter.

11. A vacuum filter according to claim 10, comprising a valve in the direct fluid flow connection communicating a gutter drain of the swimming pool with the tank, and controlling flow therebetween.

12. A vacuum filter according to claim 10, comprising a manifold and header line distribution system in the tank in fluid flow connection with the fluid flow connections commmunicating the tank with the swimming pool, and with the water recirculation system, respectively.

13. A vacuum filter according to claim 10, comprising an apertured flow distributor in the tank extending across the tank beneath the inlet flow connections from the swimming pool and the gutter drain of the swimming pool and above the filter bed.

14. A vacuum filter according to claim 10, comprising a water collection trough in the tank, extending across the tank above the filter bed, and in fluid flow communication at one end with an outlet line extending to outside the tank, for receiving and carrying off water from above the filter bed; and a valve controlling water flow through the outlet line.

15. A vacuum filter according to claim 10, comprising means for manually operating the valves between open and closed positions.

16. A vacuum filter according to claim 10, comprising means for automatically operating the valves between open and closed positions according to flow volume entering the tank above the filter bed.

* * * * *